(12) United States Patent
Yuwaki et al.

(10) Patent No.: US 10,987,862 B2
(45) Date of Patent: Apr. 27, 2021

(54) THREE-DIMENSIONAL SHAPING DEVICE

(71) Applicant: SEIKO EPSON CORPORATION, Tokyo (JP)

(72) Inventors: Kohei Yuwaki, Tsukuba (JP); Koichi Saito, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/833,013

(22) Filed: Mar. 27, 2020

(65) Prior Publication Data
US 2020/0307093 A1 Oct. 1, 2020

(30) Foreign Application Priority Data
Mar. 28, 2019 (JP) .............................. JP2019-062326

(51) Int. Cl.
B29C 64/321 (2017.01)
B29C 64/295 (2017.01)
B29C 64/209 (2017.01)
B33Y 30/00 (2015.01)

(52) U.S. Cl.
CPC .......... B29C 64/321 (2017.08); B29C 64/209 (2017.08); B29C 64/295 (2017.08); B33Y 30/00 (2014.12)

(58) Field of Classification Search
CPC ... B29C 64/321; B29C 64/295; B29C 64/209; B29C 48/00; B29C 48/02; B29C 48/49; B29C 48/387; B29C 48/255
See application file for complete search history.

(56) References Cited

U.S. PATENT DOCUMENTS

2009/0028978 A1* 1/2009 Tiesnitsch ............. B29C 48/625
425/215
2015/0321419 A1* 11/2015 Linthicum ............ B29C 48/397
264/308

FOREIGN PATENT DOCUMENTS

| JP | 2005-305927 A | 11/2005 |
| JP | 2006-192710 A | 7/2006 |
| JP | 2018-524245 A | 8/2018 |
| WO | WO-2017/019769 A1 | 2/2017 |

* cited by examiner

Primary Examiner — Joseph S Del Sole
Assistant Examiner — Mohamed K Ahmed Ali
(74) Attorney, Agent, or Firm — Chip Law Group

(57) ABSTRACT

A three-dimensional shaping device includes a melting section configured to melt a material to generate a shaping material, a supply flow channel which is communicated with the melting section, and through which the shaping material flows, a nozzle communicated with the supply flow channel and configured to eject the shaping material, an ejection amount control mechanism provided to the supply flow channel, and configured to control a flow amount of the shaping material to be ejected from the nozzle, a branch flow channel branched from a first partial flow channel as a flow channel between the melting section and the ejection amount control mechanism out of the supply flow channel, and communicated with a second partial flow channel as a flow channel between the ejection amount control mechanism and the nozzle out of the supply flow channel, and a transfer mechanism configured to transfer the shaping material in the second partial flow channel to the first partial flow channel via the branch flow channel.

4 Claims, 10 Drawing Sheets

THREE-DIMENSIONAL SHAPING DEVICE

The present application is based on, and claims priority from JP Application Serial Number 2019-062326, filed Mar. 28, 2019, the disclosure of which is hereby incorporated by reference herein in its entirety.

BACKGROUND

1. Technical Field

The present disclosure relates to a three-dimensional shaping device.

2. Related Art

For example, in JP-A-2006-192710, there is described a device which ejects a melted thermoplastic shaping material on a platform from a nozzle making a scanning movement in accordance with shape data set in advance, and further stacks the melted shaping material on the shaping material having cured on the platform to thereby form a three-dimensional shaped article.

In such a device for ejecting the shaping material from the nozzle as the device described above, since the shaping material droops like a filament from the nozzle in some cases, or the shaping material remaining in the nozzle denatures in some cases after stopping the ejection of the shaping material from the nozzle, in order to improve the quality of the three-dimensional shaped article, a further device is required.

SUMMARY

According to an aspect of the present disclosure, there is provided a three-dimensional shaping device. The three-dimensional shaping device includes a melting section configured to melt a material to generate a shaping material, a supply flow channel which is communicated with the melting section, and through which the shaping material flows, a nozzle communicated with the supply flow channel and configured to eject the shaping material, an ejection amount control mechanism provided to the supply flow channel, and configured to control a flow amount of the shaping material to be ejected from the nozzle, a branch flow channel branched from a first partial flow channel as a flow channel between the melting section and the ejection amount control mechanism out of the supply flow channel, and communicated with a second partial flow channel as a flow channel between the ejection amount control mechanism and the nozzle out of the supply flow channel, and a transfer mechanism configured to transfer the shaping material in the second partial flow channel to the first partial flow channel via the branch flow channel.

DESCRIPTION OF EXEMPLARY EMBODIMENTS

A. First Embodiment

Figure 1:
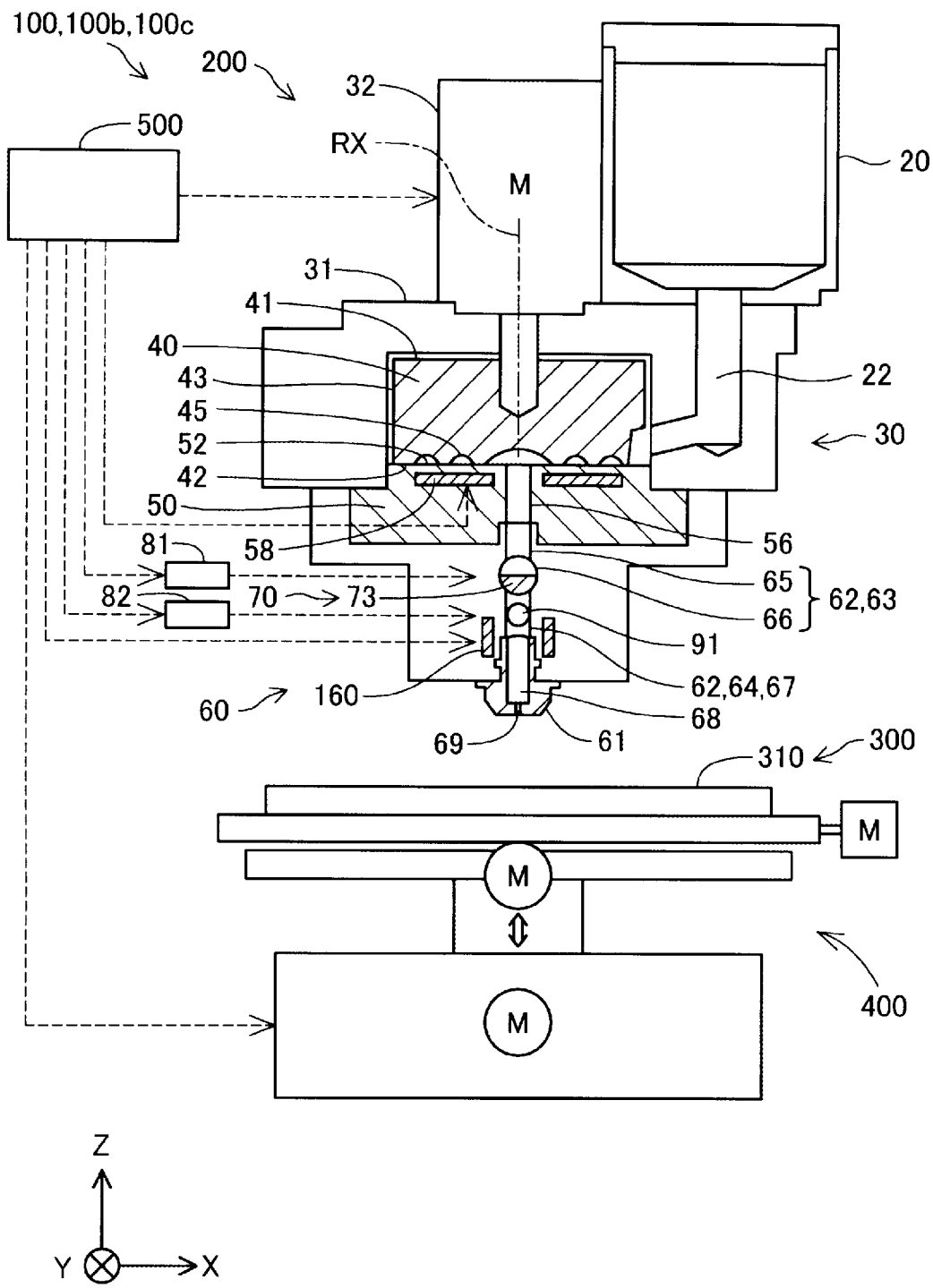
FIG. 1 is an explanatory diagram showing a schematic configuration of a three-dimensional shaping device according to a first embodiment.

FIG. 1 is an explanatory diagram showing a schematic configuration of a three-dimensional shaping device 100 according to a first embodiment. In FIG. 1, there are shown the arrows along X, Y, and Z directions perpendicular to each other, respectively. The X direction and the Y direction are directions along a horizontal direction, and the Z direction is a direction along a vertical direction. In other drawings, there are arbitrarily shown the arrows along the X, Y, and Z directions, respectively. The X, Y, and Z directions in FIG. 1 and the X, Y, and Z directions in other drawings show the same directions, respectively.

The three-dimensional shaping device 100 according to the present embodiment is provided with a shaping unit 200, a stage 300, a transfer mechanism 400, and a control section 500. The three-dimensional shaping device 100 drives the transfer mechanism 400 to change the relative position between a nozzle 61 and a shaping surface 310 while ejecting the shaping material from a nozzle 61 provided to the shaping unit 200 toward the shaping surface 310 of the stage 300 under the control by the control section 500 to thereby shape a three-dimensional shaped article having a desired shape on the shaping surface 310.

The transfer mechanism 400 changes the relative position between the nozzle 61 and the shaping surface 310. In the present embodiment, the transfer mechanism 400 moves the stage 300 with respect to the shaping unit 200 to thereby change the relative position between the nozzle 61 and the shaping surface 310. The transfer mechanism 400 in the present embodiment is formed of a triaxial positioner for moving the stage 300 in triaxial directions, namely the X, Y, and Z directions with driving forces of three motors. Each of the motors is driven under the control by the control section 500. It should be noted that it is also possible for the transfer mechanism 400 to be provided with a configuration of changing the relative position between the nozzle 61 and the shaping surface 310 by moving the shaping unit 200 without moving the stage 300 instead of the configuration of moving the stage 300. Further, it is also possible for the transfer mechanism 400 to be provided with a configuration of moving both of the stage 300 and the shaping unit 200 to thereby change the relative position between the nozzle 61 and the shaping surface 310.

The control section 500 is formed of a computer provided with at least one processor, a main storage device, and an input/output interface for performing input/output of a signal with the outside. In the present embodiment, the control section 500 controls the operations of the shaping unit 200 and the transfer mechanism 400 by the processor executing a program and a command retrieved on the main storage device to perform the shaping process for shaping the three-dimensional shaped article. In the operation, there is included a shift of a three-dimensional relative position between the shaping unit 200 and the stage 300. It should be noted that it is also possible for the control section 500 to be formed by a combination of a plurality of circuits instead of the computer.

The shaping unit 200 is provided with a material supply section 20 as a supply source of the material, a melting section 30 for melting the material supplied from the material supply section 20 to make the shaping material, and an ejection section 60 having the nozzle 61 for ejecting the shaping material supplied from the melting section 30.

In the material supply section 20, there is housed a material in the form of a pellet, a powder, or the like. In the present embodiment, ABS resin formed to have a pellet shape is used as the material. The material supply section 20 in the present embodiment is formed of a hopper. A supply channel 22 for coupling the material supply section 20 and the melting section 30 to each other is disposed below the material supply section 20. The material supply section 20 supplies the melting section 30 with the material via the supply channel 22.

The melting section 30 is provided with a screw case 31, a drive motor 32, a flat screw 40, and a barrel 50. The melting section 30 melts at least a part of the material in a solid state supplied from the material supply section 20 to make the shaping material in paste form having fluidity, and then supplies the shaping material to the ejection section 60.

The screw case 31 is a housing for housing the flat screw 40. To the lower surface of the screw case 31, there is fixed the barrel 50, and in a space surrounded by the screw case 31 and the barrel 50, there is housed the flat screw 40. To the upper surface of the screw case 31, there is fixed the drive motor 32. The rotary shaft of the drive motor 32 is coupled to the upper surface 41 side of the flat screw 40. The drive motor 32 is driven under the control by the control section 500.

The flat screw 40 has a substantially cylindrical shape small in height in a direction along a central axis RX than the diameter. The flat screw 40 is disposed inside the screw case 31 so that the central axis RX becomes parallel to the Z direction. Due to the torque generated by the drive motor 32, the flat screw 40 rotates around the central axis RX inside the screw case 31.

The flat screw 40 has a groove forming surface 42 having groove parts 45 formed on the opposite side to the upper surface 41 in a direction along the central axis RX. It should be noted that a specific configuration of the flat screw 40 and the groove parts 45 will be described later.

The barrel 50 is disposed below the flat screw 40. The barrel 50 has a screw-opposed surface 52 opposed to the groove forming surface 42 of the flat screw 40. The barrel 50 is provided with a communication hole 56 communicated with the ejection section 60 disposed on the central axis RX of the flat screw 40. The barrel 50 incorporates a heater 58 at a position opposed to the groove parts 45 of the flat screw 40. The temperature of the heater 58 is controlled by the control section 500. It should be noted that the detailed configuration of the screw-opposed surface 52 will be described later.

The ejection section 60 is fixed to a lower surface of the barrel 50. The ejection section 60 is provided with a supply flow channel 62 which is communicated with the melting section 30, and through which the shaping material supplied from the melting section 30 flows, the nozzle 61 which is communicated with the supply flow channel 62, and which ejects the shaping material, and an ejection amount control mechanism 70 which is provided to the supply channel 62, and which controls the flow amount of the shaping material ejected from the nozzle 61. The supply flow channel 62 has a first partial flow channel 63 as a part between the melting section 30 and the ejection amount control mechanism 70, and a second partial flow channel 64 as a part between the ejection amount control mechanism 70 and the nozzle 61. In the present embodiment, the first partial flow channel 63 is constituted by a first supply port 65 and a through hole 66. The second partial flow channel 64 is formed of a second supply port 67. The first supply port 65 extends in the vertical direction. An upper end of the first supply port 65 is coupled to the communication hole 56 of the barrel 50, and a lower end of the first supply port 65 is coupled to the through hole 66. The second supply port 67 extends in the vertical direction. An upper end of the second supply port 67 is coupled to the through hole 66, and a lower end of the second supply port 67 is coupled to the nozzle 61. The shaping material supplied from the communication hole 56 of the barrel 50 to the first supply port 65 flows through the through hole 66, the second supply port 67, and the nozzle 61 in this order.

The nozzle 61 is provided with a nozzle flow channel 68 and a nozzle hole 69. The nozzle flow channel 68 is a flow channel disposed inside the nozzle 61. The nozzle flow channel 68 is coupled to the second supply port 67. The nozzle 69 is a part disposed at an end part on the side communicated with the air of the nozzle flow channel 68, and is a part reduced in flow channel cross-section. The shaping material supplied from the second supply port 67 to the nozzle flow channel 68 is ejected from the nozzle hole 69. In the present embodiment, the opening shape of the nozzle hole 69 is a circular shape. It should be noted that the opening shape of the nozzle hole 69 is not limited to the circular shape, but can also be a quadrangular shape or the like.

The ejection amount control mechanism 70 is provided with a valve part 73 disposed inside the through hole 66, and a first drive section 81 for rotating the valve part 73. The first drive section 81 is formed of an actuator such as a stepping motor, and rotates the valve part 73 inside the through hole 66 under the control by the control section 500. The ejection amount control mechanism 70 rotates the valve part 73 to control the flow amount of the shaping material flowing from the first supply port 65 to the second supply port 67 to thereby control the flow amount of the shaping material to be ejected from the nozzle 61. The flow amount of the shaping material to be ejected from the nozzle 61 is also referred to as an ejection amount. It should be noted that a specific configuration of the ejection amount control mechanism 70 will be described later.

On the outer circumference of the second supply channel 67, there is disposed a nozzle heater 160. The nozzle heater 160 heats the shaping material in the second supply port 67. The temperature of the nozzle heater 160 is controlled by the control section 500. It should be noted that the nozzle heater 160 is also referred to as a heating section in some cases.

Figure 2:
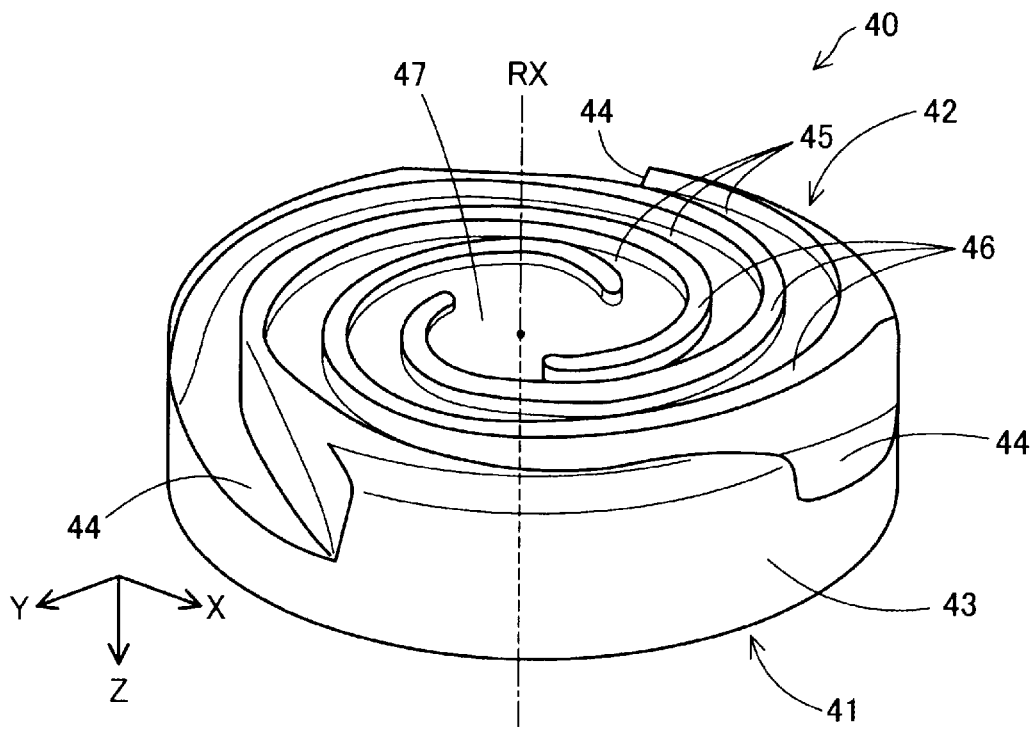
FIG. 2 is a schematic perspective view showing a configuration on a groove forming surface side of a flat screw.

FIG. 2 is a schematic perspective view showing a configuration on the groove forming surface 42 side of the flat screw 40. In FIG. 2, the position of the central axis RX of the flat screw 40 is represented by the dashed-dotted line. As described with reference to FIG. 1, the groove forming surface 42 is provided with the groove parts 45.

A central part 47 of the groove forming surface 42 of the flat screw 40 is formed as a recessed part to which one end of each of the groove parts 45 is coupled. The central part 47 is opposed to the communication hole 56 of the barrel 50 shown in FIG. 1. The central part 47 crosses the central axis RX.

The groove parts 45 of the flat screw 40 each form a so-called scrolling groove. The groove parts 45 each extend in a vortical manner from the central part 47 toward the outer circumference of the flat screw 40 so as to draw an arc. The groove parts 45 can also be formed so as to extend in a spiral manner. The groove forming surface 42 is provided with convex stripe parts 46 each constituting a sidewall part of each of the groove parts 45, and extending along the groove parts 45.

The groove parts 45 each continue to a material introduction port 44 formed on a side surface 43 of the flat screw 40. The material introduction port 44 is a part for receiving the material supplied via the supply channel 22 of the material supply section 20.

In FIG. 2, there is shown an example of the flat screw 40 having three groove parts 45 and three convex stripe parts 46. The number of the groove parts 45 and the number of convex stripe parts 46 provided to the flat screw 40 are not limited to three. It is possible to provide just one groove part 45 to the flat screw 40, or to provide a plurality of, namely two or more, groove parts 45 to the flat screw 40. Further, it is also possible to dispose an arbitrary number of convex stripe parts 46 in accordance with the number of the groove parts 45.

In FIG. 2, there is illustrated an example of the flat screw 40 having the material introduction ports 44 formed at three places. The number of the places where the material introduction ports 44 are disposed in the flat screw 40 is not limited to three. It is possible to dispose the material introduction port 44 at just one place in the flat screw 40, or to dispose the material introduction ports 44 at a plurality of places, namely two or more places, in the flat screw 40.

Figure 3:
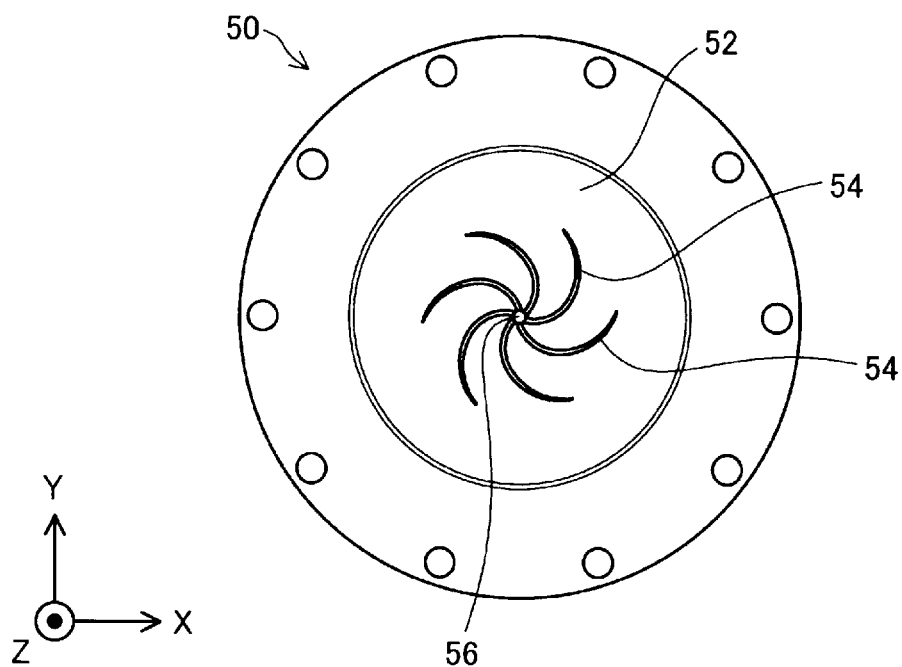
FIG. 3 is a top view showing a configuration of an opposed surface of a screw of a barrel.

FIG. 3 is a top view showing a configuration of the screw-opposed surface 52 of the barrel 50 according to the present embodiment. As described above, at the center of the screw-opposed surface 52, there is formed a communication hole 56 communicated with the ejection section 60. On the periphery of the communication hole 56 in the screw-opposed surface 52, there is formed a plurality of guide grooves 54. Each of the guide grooves 54 is coupled to the communication hole 56 at one end, and extends in a vertical manner from the communication hole 56 toward the outer circumference of the screw-opposed surface 52. Each of the guide grooves 54 has a function of guiding the shaping material to the communication hole 56.

Figure 4:
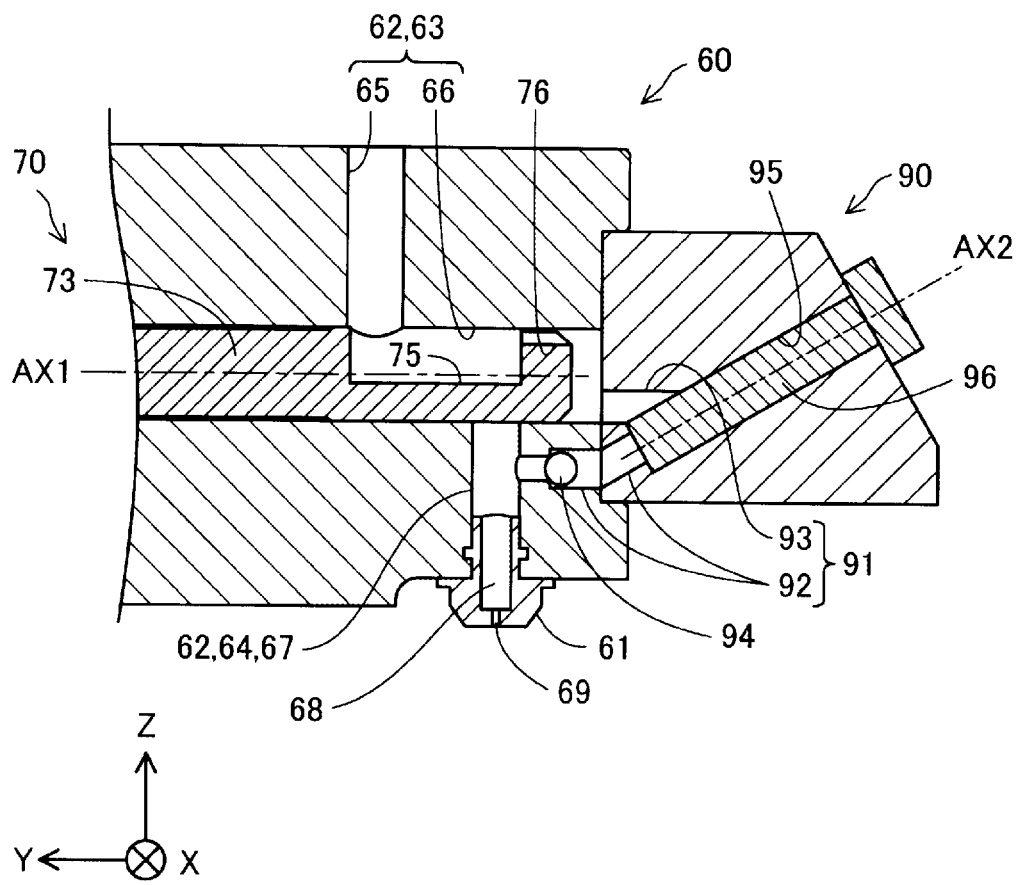
FIG. 4 is an explanatory diagram showing a configuration of an ejection amount control mechanism and a transfer mechanism.
Figure 5:
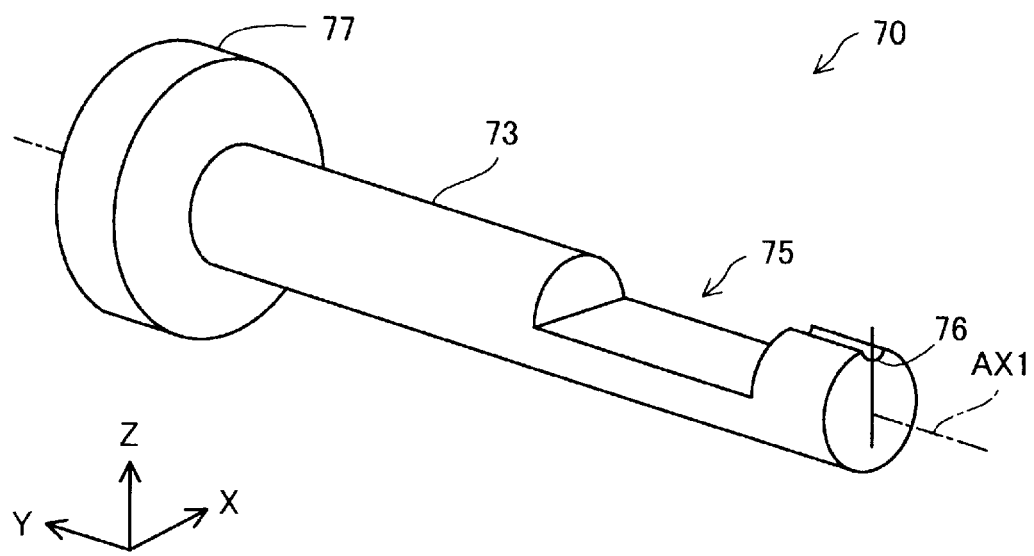
FIG. 5 is a perspective view showing a configuration of a valve part.

FIG. 4 is an explanatory diagram showing a configuration of the ejection amount control mechanism 70 and a transfer mechanism 90 in the present embodiment. FIG. 5 is a perspective view showing a configuration of the valve part 73 of the ejection amount control mechanism 70 in the present embodiment. The ejection section 60 is provided with the ejection amount control mechanism 70 described above and the transfer mechanism 90. The first supply port 65 and the second supply port 67 provided to the ejection section 60 each extend in the vertical direction as described above. The through hole 66 extends in the horizontal direction. The first supply port 65 and the second supply port 67 are coupled to the through hole 66 at respective positions shifted in the horizontal direction from each other.

As described above, the ejection amount control mechanism 70 is provided with the valve part 73 having a cylindrical shape and disposed inside the through hole 66. The valve part 73 has a central axis AX1. In the valve part 73, there is disposed a recessed part 75 by cutting a part of an outer circumference of the cylindrical shape so as to have a semilunar shape. The recessed part 75 extends along the central axis AX1 from below the first supply port 65 to above the second supply port 67. The valve part 73 is provided with a communication part 76 having a groove shape disposed on the outer circumference of the cylindrical shape along the central axis AX1 from a wall surface of the valve part 73 defining the recessed part 75 to a tip part on the −Y direction side of the valve part 73. The communication part 76 communicates the first supply port 65 and a second branch port 93 described later with each other. In an end part in the +Y direction side of the valve part 73, there is disposed an operation part 77. To the operation part 77, there is coupled a first drive section 81. By the torque due to the first drive section 81 being applied to the operation part 77, the valve part 73 rotates. It should be noted that the communication part 76 can also be a hole instead of the groove, the hole penetrating from the wall surface of the valve part 73 defining the recessed part 75 to the tip part on the −Y direction side of the valve part 73. The recessed part 75 is also referred to as a flow passage in some cases.

Figure 6:
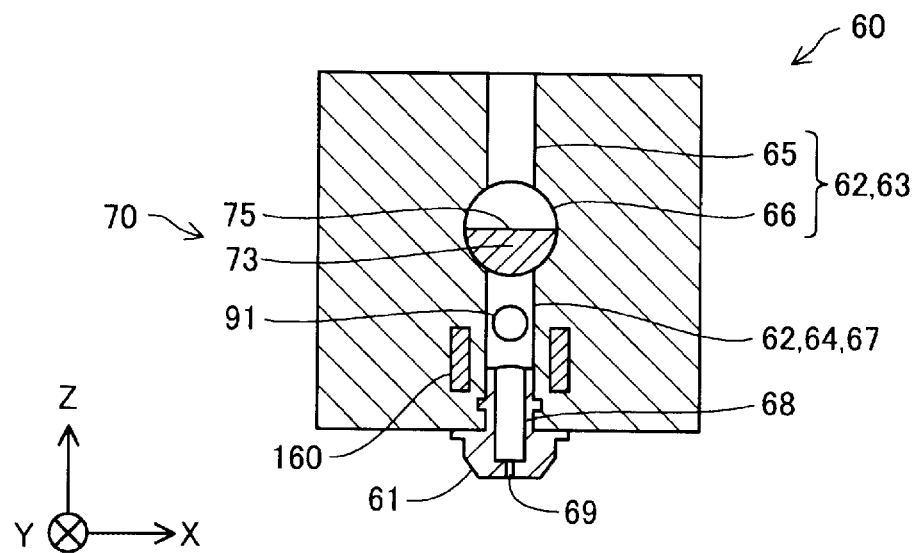
FIG. 6 is a first explanatory diagram showing an operation of the valve part.
Figure 7:
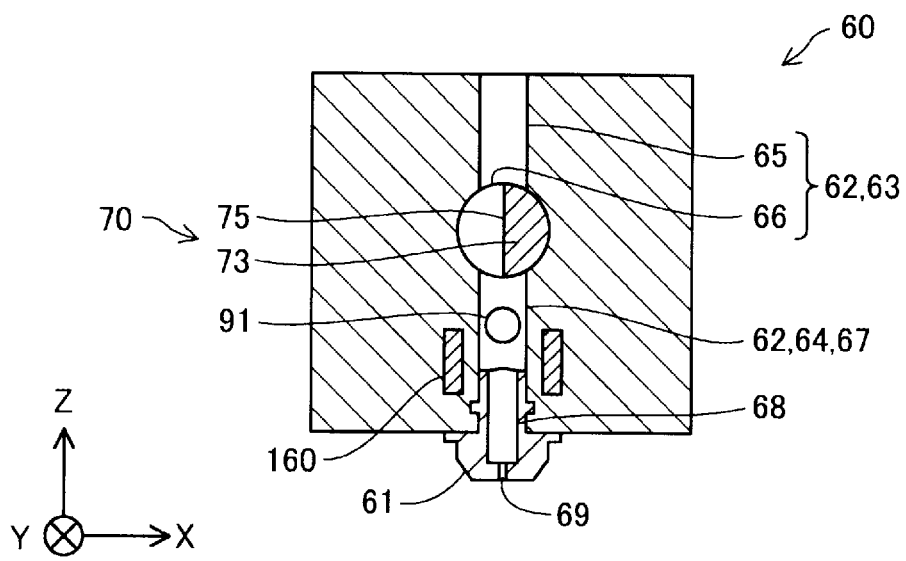
FIG. 7 is a second explanatory diagram showing the operation of the valve part.

FIG. 6 is a first explanatory diagram showing an operation of the valve part 73. FIG. 7 is a second explanatory diagram showing the operation of the valve part 73. As shown in FIG. 6, when the valve part 73 rotates so that the recessed part 75 is located above, the second supply port 67 is blocked by the valve part 73 to block off the inflow of the shaping material from the first supply port 65 to the second supply port 67. In contrast, when the valve part 73 rotates so that the recessed part 75 faces to the +X direction or the −X direction as shown in FIG. 7, the first supply port 65 and the second supply port 67 are communicated with each other, and thus, the shaping material inflows from the first supply port 65 to the second supply port 67 at the maximum flow rate. In other words, the cross-sectional area of the flow channel between the first supply port 65 and the second supply port 67 changes in accordance with the rotation of the valve part 73, and thus, the flow rate of the shaping material inflowing from the first supply port 65 to the second supply port 67 changes.

The transfer mechanism 90 will be described with reference to FIG. 4. The ejection section 60 is provided with a branch flow channel 91. The branch flow channel 91 has a first branch port 92 branched from the second supply port 67 and a second branch port 93 coupled to an end part on the −Y direction side of the through hole 66. The first branch port 92 is coupled to an opening part disposed at one end of a cylinder 95. The second branch port 93 is coupled to an opening part disposed on a side surface of the cylinder 95. It should be noted that a part of the cylinder 95 located between the first branch port 92 and the second branch port 93 is also included in the branch flow channel 91.

The transfer mechanism 90 is provided with the cylinder 95 described above, a plunger 96 shaped like a shaft and disposed inside the cylinder 95, a second drive section 82 for translating the plunger 96 inside the cylinder 95, and a check valve 94 disposed in the first branch port 92. The cylinder 95 has a central axis AX2. An end of the plunger 96 is coupled to the second drive section 82 shown in FIG. 1. The second drive section 82 is constituted by a stepping motor, a rack-and-pinion mechanism, a ball screw mechanism, or the like. The second drive section 82 translates the plunger 96 along the central axis AX2 of the cylinder 95 under the control by the control section 500. Translating the plunger 96 so that the first branch port 92 gets away from an end part of the cylinder 95 on the side to which the first branch port 92 is coupled is referred to as pulling the plunger 96. In contrast, translating the plunger 96 so that the first branch port 92 comes closer to the end part of the cylinder 95 on the side to which the first branch port 92 is coupled is referred to as pushing the plunger 96. The check valve 94 opens due to the pressure toward the cylinder 95 from the second supply port 67, and closes due to the pressure toward the second supply port 67 from the cylinder 95. Therefore, the check valve 94 allows the shaping material to inflow from the second supply port 67 to the cylinder 95, and restricts outflow of the shaping material from the cylinder 95 to the second supply port 67.

Figure 8:
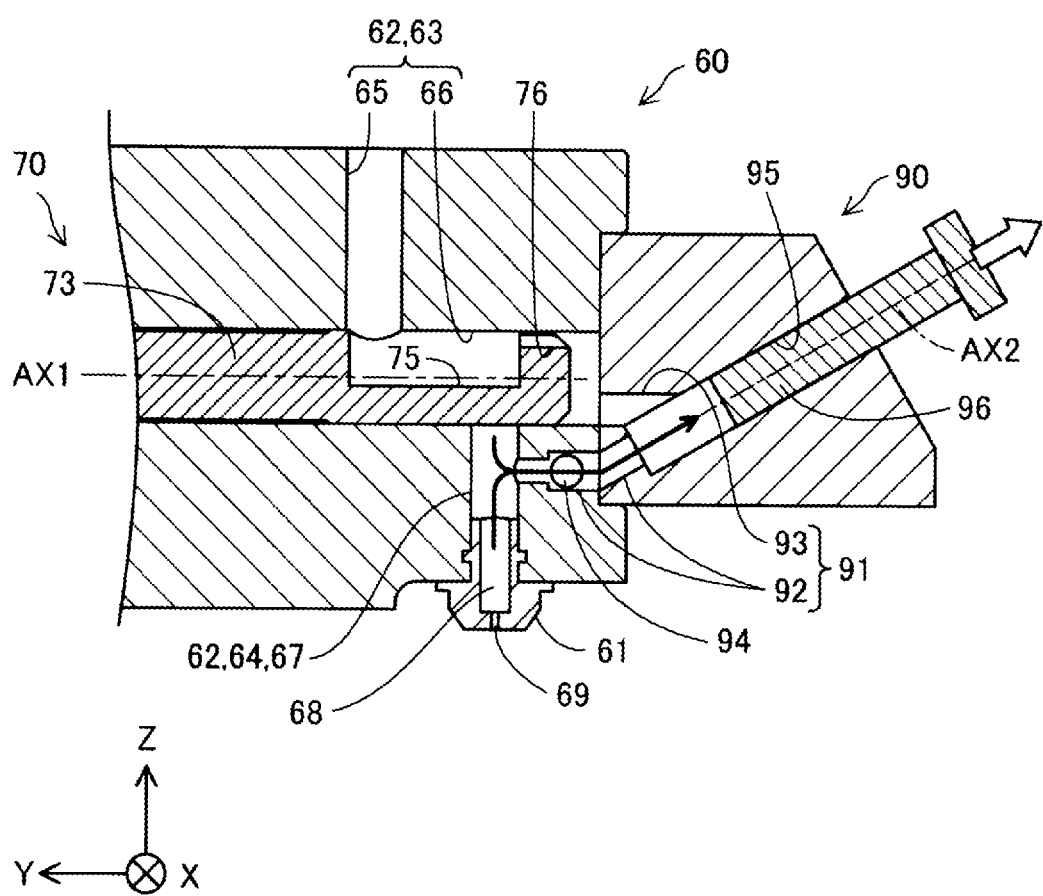
FIG. 8 is an explanatory diagram showing a flow of a shaping material when pulling a plunger.

FIG. 8 is an explanatory diagram showing a flow of the shaping material when pulling the plunger 96. In FIG. 8, the direction of the flow of the shaping material is indicated using the arrow. The control section 500 controls the second drive section 82 to pull the plunger 96. When the plunger 96 has been pulled, since negative pressure occurs inside the cylinder 95, the check valve 94 opens, and the shaping material in the nozzle 61 and the second supply port 67 is suctioned into the cylinder 95 via the first branch port 92. It should be noted that due to this operation, the shaping material which is in the process of being ejected from the nozzle 61 is pulled into the nozzle 61, and thus, it is possible to achieve tail-cutting of the shaping material.

Figure 9:
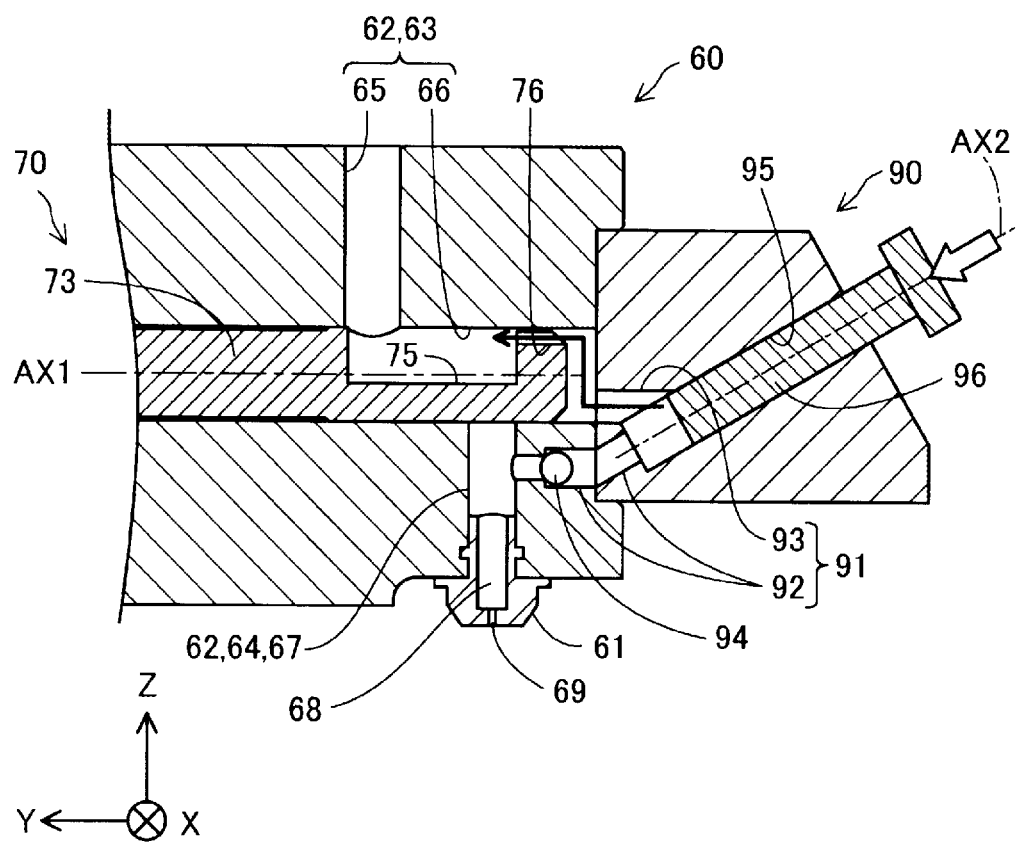
FIG. 9 is an explanatory diagram showing a flow of the shaping material when pushing the plunger.

FIG. 9 is an explanatory diagram showing a flow of the shaping material when pushing the plunger 96. In FIG. 9, the direction of the flow of the shaping material is indicated using the arrow. The control section 500 drives the second drive section 82 to push the plunger 96. When the plunger 96 has been pushed, since the inside of the cylinder 95 is pressurized, the check valve 94 is closed, and the shaping material in the cylinder 95 is discharged to the inside of the recessed part 75 from the second branch port 93 through the communication part 76. Therefore, by pulling the plunger 96 to suction the shaping material into the cylinder 95 and then pushing the plunger 96, it is possible for the transfer mechanism 90 to transfer the shaping material in the nozzle 61 and the second supply port 67 to the inside of the recessed part 75.

Figure 10:
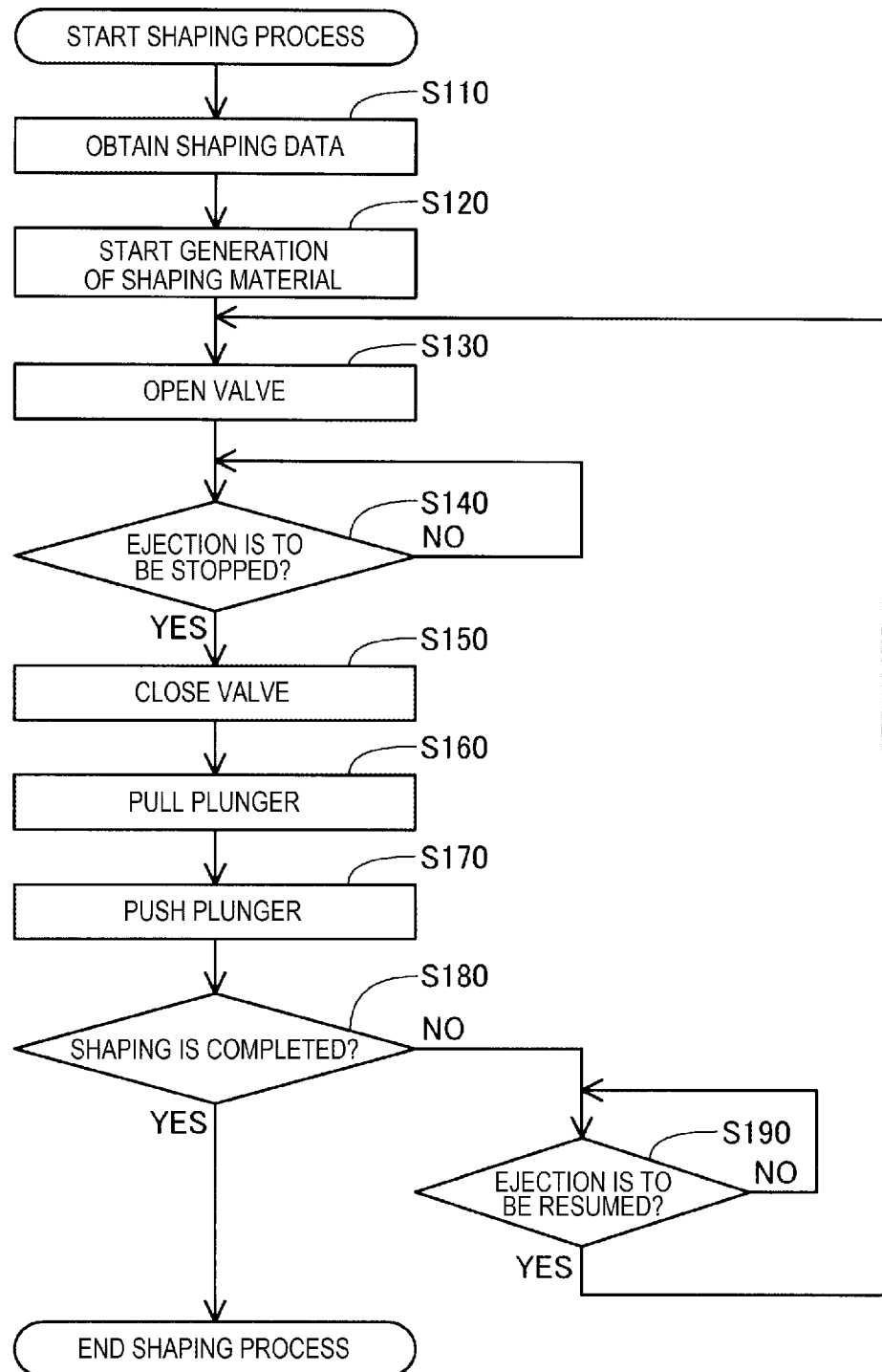
FIG. 10 is a flowchart showing a content of a shaping process in the first embodiment.

FIG. 10 is a flowchart showing a content of a shaping process in the present embodiment. This process is executed by the control section 500 when a predetermined start operation is performed by a user on an operation panel provided to the three-dimensional shaping device 100 or a computer coupled to the three-dimensional shaping device 100.

Firstly, the control section 500 obtains shaping data of the three-dimensional shaped article in the step S110. The shaping data is obtained from, for example, the computer or a recording medium coupled to the three-dimensional shaping device 100. The shaping data denotes data for shaping the three-dimensional shaped article using the three-dimensional shaping device 100. In the shaping data, there are represented a moving path of the nozzle 61 with respect to the stage 300, an amount of ejection of the shaping material to be ejected from the nozzle 61 on the moving path, and so on. Shape data representing a shape of the three-dimensional shaped article generated using three-dimensional CAD software or three-dimensional CG software is read in, for example, slicer software on the computer coupled to the three-dimensional shaping device 100, and thus, the shaping data is generated. As the shape data to be read in the slicer software, it is possible to use data in the STL format, the AMF format, or the like.

Then, in the step S120, the control section 500 starts generation of the shaping material. The control section 500 controls the rotation of the flat screw 40, and the temperature of the heater 58 incorporated in the barrel 50 to thereby melt the material to generate the shaping material. Due to the rotation of the flat screw 40, the material supplied from the material supply section 20 is introduced into the groove parts 45 from the material introduction ports 44 of the flat screw 40. The material introduced into the groove parts 45 is conveyed to the central part 47 along the groove parts 45. The material conveyed inside the groove parts 45 is at least partially melted due to the shear caused by a relative rotation between the flat screw 40 and the barrel 50 and heating by the heater 58, and thus, turns to the shaping material in paste form having fluidity. The shaping material collected in the central part 47 is supplied to the ejection section 60 through the communication hole 56 due to the internal pressure generated in the central part 47. It should be noted that the shaping material continues to be generated during the execution of this process.

In the step S130, the control section 500 controls the ejection amount control mechanism 70 to thereby communicate the first supply port 65 and the second supply port 67 with each other to start ejection of the shaping material from the nozzle 61. By starting the ejection of the shaping material from the nozzle 61, shaping of the three-dimensional shaped article is started.

In the step S140, the control section 500 determines whether or not the ejection of the shaping material from the nozzle 61 is to be stopped. When it has not been determined in the step S140 that the ejection of the shaping material from the nozzle 61 is to be stopped, the control section 500 continues the shaping of the three-dimensional shaped article while repeating the process in the step S140 until it is determined in the step S140 that the ejection of the shaping material from the nozzle 61 is to be stopped. In contrast, when it has been determined in the step S140 that the ejection of the shaping material from the nozzle 61 is to be stopped, the control section 500 controls the ejection amount control mechanism 70 to thereby block off the inflow of the shaping material from the first supply port 65 to the second supply port 67 in the step S150. By the inflow of the shaping material from the first supply port 65 to the second supply port 67 being blocked off, the ejection of the shaping material from the nozzle 61 is stopped.

After the inflow of the shaping material from the first supply port 65 to the second supply port 67 is blocked off, the control section 500 controls the second drive section 82 to pull the plunger 96 in the step S160 to suction the shaping material remaining in the nozzle 61 and the second supply port 67 into the cylinder 95. In the step S170, the control section 500 controls the second drive section 82 to push the plunger 96 to thereby discharge the shaping material having been suctioned into the cylinder 95 to the inside of the recessed part 75.

Subsequently, in the step S180, the control section 500 determines whether or not the shaping of the three-dimensional shaped article has been completed. When it has not been determined in the step S180 that the shaping of the three-dimensional shaped article has been completed, the control section 500 determines in the step S190 whether or not the ejection of the shaping material from the nozzle 61 is to be resumed. When it has been determined in the step S190 that the ejection of the shaping material from the nozzle 61 is to be resumed, the control section 500 returns the process to the step S130 to control the ejection amount control mechanism 70 to thereby communicate the first supply port 65 and the second supply port 67 with each other to resume the ejection of the shaping material from the nozzle 61. By the ejection of the shaping material from the nozzle 61 being resumed, shaping of the three-dimensional shaped article is resumed. In contrast, when it has not been determined in the step S190 that the ejection of the shaping material from the nozzle 61 is to be resumed, the control section 500 stands ready to shape the three-dimensional shaped article while repeating the process in the step S190 until it is determined that the ejection of the shaping material from the nozzle 61 is to be resumed.

When it has been determined in the step S180 that the shaping of the three-dimensional shaped article has been completed, the control section 500 terminates this process. In such a manner, the three-dimensional shaped article is shaped on the stage 300.

According to the three-dimensional shaping device 100 according to the present embodiment described hereinabove, the control section 500 controls the ejection amount control mechanism 70 to transfer the shaping material in the nozzle 61 and the second supply port 67 to the inside of the recessed part 75 in a period from stopping the ejection of the shaping material from the nozzle 61 to resuming the ejection. Therefore, it is possible to prevent the shaping material from drooping like a filament from the nozzle to cause so called stringing, and the shaping material remaining in the nozzle 61 and the second supply port 67 from denaturing. In particular, in the present embodiment, the control section 500 controls the second drive section 82 to pull the plunger 96 to thereby suction the shaping material in the nozzle 61 and the second supply port 67 into the cylinder 95, and to push the plunger 96 while preventing the outflow of the shaping material from the inside of the cylinder 95 to the inside of the second supply port 67 by the check valve 94 to thereby discharge the shaping material thus suctioned into the cylinder 95 to the inside of the recessed part 75. Therefore, it is possible to effectively transfer the shaping material in the nozzle 61 and the second supply port 67 into the recessed part 75 due to the reciprocation of the plunger 96.

Further, in the present embodiment, since the control section 500 controls the first drive section 81 to rotate the valve part 73 to thereby communicate the first supply port 65 and the second supply port 67 with each other, it is possible to start and stop the ejection of the shaping material from the nozzle 61. Therefore, it is possible to start and stop the ejection of the shaping material from the nozzle 61 with a simple configuration.

Further, in the present embodiment, it is possible to heat the shaping material in the nozzle 61 and the second supply port 67 using the nozzle heater 160. Therefore, it is possible to enhance the fluidity of the shaping material to be ejected from the nozzle 61. In particular, in the present embodiment, it is possible to transfer the shaping material in the nozzle 61 and the second supply port 67 located close to the nozzle heater 160 to the inside of the recessed part 75 distant from the nozzle heater 160. Therefore, it is possible to prevent the shaping material in the nozzle 61 and the second supply port 67 from receiving the heat from the nozzle heater 160 for a long period of time to thereby denature during a period in which the ejection of the shaping material from the nozzle 61 is stopped.

It should be noted that although in the present embodiment, the ABS resin shaped like a pellet is used as the material, a material for shaping the three-dimensional shaped article including a variety of materials such as a material having thermoplastic property, a metal material, or a ceramic material as a principal material can also be adopted as the material used in the shaping unit 200. Here, the "principal material" means the material playing a central role for forming the shape of the three-dimensional shaped article, and means the material having a content rate not lower than 50% by weight in the three-dimensional shaped article. The shaping material described above includes those obtained by melting the principal material thereof alone, or those obtained by melting some of the components included therein together with the principal material in paste form.

The material having a thermoplastic property as the principal material is used, the material plasticizes in the melting section 30 to thereby generate the shaping material. The term "plasticization" means that heat is applied to the material having the thermoplastic property to melt the material. Further, the term "melt" also means that the material having a thermoplastic property is heated at a temperature not lower than the glass-transition point to thereby be softened, and thus, the fluidity is developed.

As the material having a thermoplastic property, for example, it is possible to use any one of the following thermoplastic resin materials or a thermoplastic resin material obtained by combining two or more of the following thermoplastic resin materials.

Examples of Thermoplastic Resin Material general-purpose engineering plastic such as polypropylene resin (PP), polyethylene resin (PE), polyacetal resin (POM), polyvinyl chloride resin (PVC), polyamide resin (PA), acrylonitrile-butadiene-styrene resin (ABS), polylactic resin (PLA), polyphenylene sulfide resin (PPS), polycarbonate (PC), modified polyphenylene ether, polybutylene terephthalate, or polyethylene terephthalate, engineering plastic such as polysulfone, polyether sulfone, polyphenylene sulfide, polyarylate, polyimide, polyamide-imide, polyetherimide, or polyether ether ketone (PEEK)

In the material having a thermoplastic property, there can be mixed pigment, metal, ceramic, and in addition, an additive agent such as wax, flame retardant, antioxidant, or thermal stabilizer, and so on. In the melting section 30, the material having a thermoplastic property is plasticized by the rotation of the flat screw 40 and heating by the heater 58 to be transformed into the melted state. Further, the shaping material generated in such a manner is ejected from the nozzle 69, and then cures due to drop in temperature.

It is desirable for the material having a thermoplastic property to be heated at a temperature not lower than the glass-transition point and then ejected from the nozzle hole 69 in the completely melted state. It should be noted that the "completely melted state" means the state in which there is no unmelted material having a thermoplastic property, and means the state in which no solid matter shaped like a pellet remains when, for example, using the thermoplastic resin shaped like a pellet as the material.

In the shaping unit 200, the following metal material, for example, can be used as the principal material instead of the material having a thermoplastic property described above. In this case, it is desirable that the components to be melted when generating the shaping material are mixed in a powder material obtained by powdering the metal material described below, and then the mixture is loaded into the melting section 30.

Example of Metal Material magnesium (Mg), iron (Fe), cobalt (Co), chromium (Cr), aluminum (Al), titanium (Ti), copper (Co), or nickel (Ni) as a single metal, or alloys including one or more of these metals Example of Alloy maraging steel, stainless steel, cobalt-chromium-molybdenum, titanium alloy, nickel alloy, aluminum alloy, cobalt alloy, and cobalt-chrome alloy)

In the shaping unit 200, it is possible to use a ceramic material as the principal material instead of the metal material described above. As the ceramic material, it is possible to use, for example, oxide ceramics such as silicon dioxide, titanium dioxide, aluminum oxide, or zirconium oxide, and non-oxide ceramics such as aluminum nitride. When using the metal material or the ceramic material described above as the principal material, it is possible for the shaping material disposed on the stage 300 to be made to cure by calcination due to, for example, irradiation with a laser or hot air.

The powder material of the metal material or the ceramic material to be loaded into the material supply section 20 can also be a mixed material obtained by mixing a plurality of types of single metal powder, alloy powder, or ceramic material powder. Further, the powder material of the metal material or the ceramic material can also be coated with, for example, the thermoplastic resin as illustrated above or other thermoplastic resin. In this case, it is also possible to assume that the thermoplastic resin is melted to develop the fluidity in the melting section 30.

It is also possible to add, for example, the following solvent to the powder material of the metal material or the ceramic material to be loaded into the material supply section 20. As the solvent, it is also possible to use one species selected from the following, or two or more species selected from the following in combination.

Example of Solvent water; a (poly)alkylene glycol monoalkyl ether group such as ethylene glycol monomethyl ether, ethylene glycol monoethyl ether, propylene glycol monomethyl ether, or propylene glycol monoethyl ether; an ester acetate group such as ethyl acetate, n-propyl acetate, isopropyl acetate, n-butyl acetate, or isobutyl acetate; an aromatic hydrocarbon group such as benzene, toluene, or xylene; a ketone group such as methyl ethyl ketone, acetone, methyl isobutyl ketone, ethyl-n-butyl ketone, diisopropyl ketone, or acethylacetone; an alcohol group such as ethanol, propanol, or butanol; a tetraalkylammonium acetate group; a sulfoxide series solvent such as dimethyl sulfoxide, or diethyl sufoxide; a pyridine series solvent such as pyridine, γ-picoline, or 2,6-lutidine; tetraalkylammonium acetate (e.g., tetrabutylammonium acetate); an ionic liquid such as butyl carbitol acetate Besides the above, it is also possible to add, for example, the following binder to the powder material of the metal material or the ceramic material to be loaded into the material supply section 20.

Figure 11:
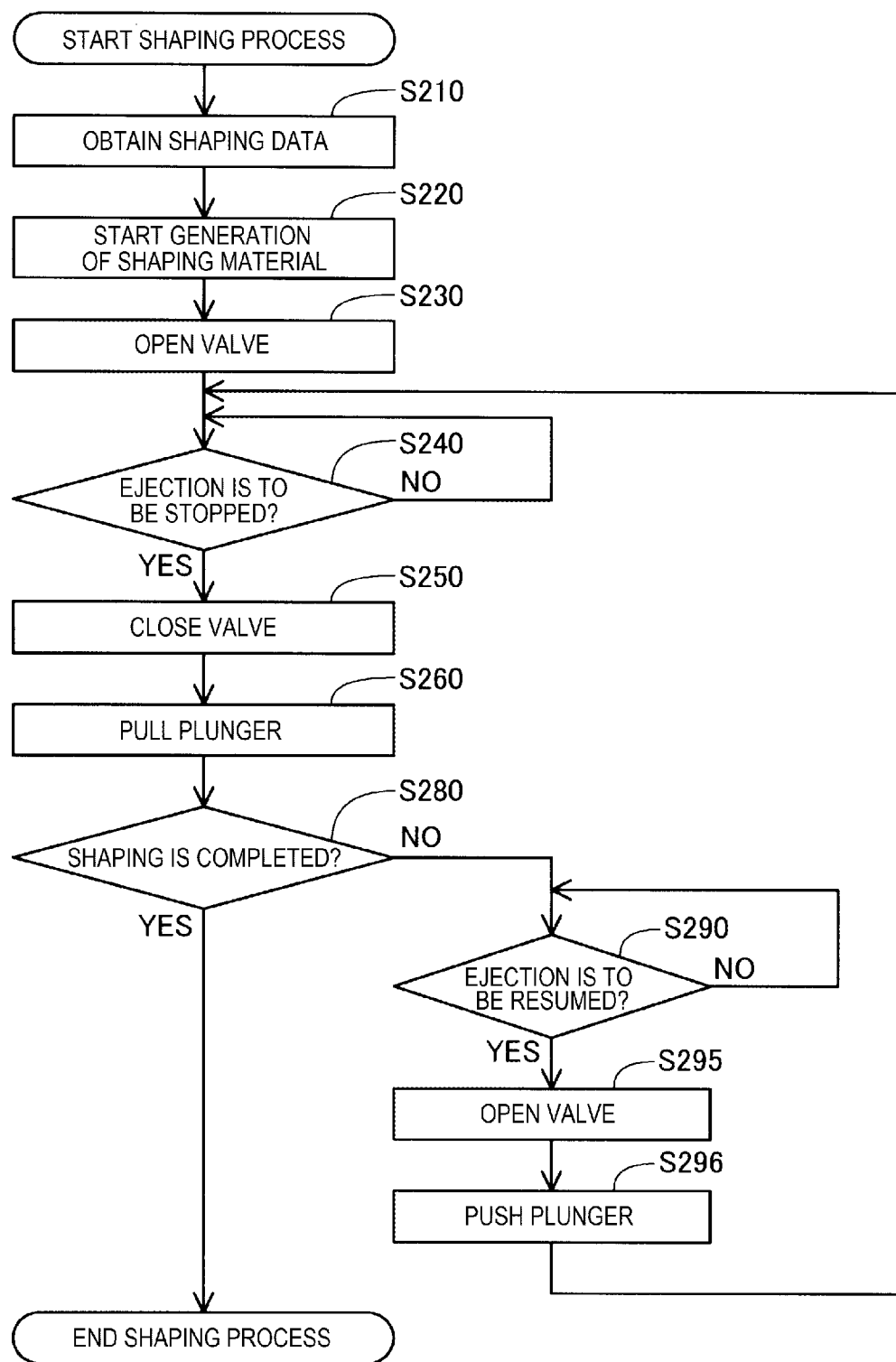
FIG. 11 is a flowchart showing a content of a shaping process in a second embodiment.

Example of Binder acrylic resin, epoxy resin, silicone resin, cellulosic resin, or other synthetic resin, polylactic acid (PLA), polyamide (PA), polyphenylene sulfide (PPS), polyether ether ketone (PEEK), or other thermoplastic resin B. Second Embodiment FIG. 11 is a flowchart showing a content of the shaping process executed in a three-dimensional shaping device 100b according to a second embodiment. The second embodiment is different in the content of the shaping process from the first embodiment. The other configurations are the same as those of the first embodiment shown in FIG. 1 unless particularly described.

The content of the process in the steps S210 through S260 is the same as in the first embodiment. The control section 500 controls the second drive section 82 to pull the plunger 96 in the step S260, and then determines in the step S280 whether or not shaping of the three-dimensional shaped article has been completed. When it has been determined in the step S280 that the shaping of the three-dimensional shaped article has been completed, the control section 500 terminates this process. In contrast, when it has not been determined in the step S280 that the shaping of the three-dimensional shaped article has been completed, the control section 500 determines in the step S290 whether or not the ejection of the shaping material from the nozzle 61 is to be resumed.

When it has not been determined in the step S290 that the ejection of the shaping material from the nozzle 61 is to be resumed, the control section 500 stands ready to shape the three-dimensional shaped article while repeating the process in the step S290 until it is determined that the ejection of the shaping material from the nozzle 61 is to be resumed. In contrast, when it has been determined in the step S290 that the ejection of the shaping material from the nozzle 61 is to be resumed, the control section 500 controls the ejection amount control mechanism 70 in the step S295 to thereby communicate the first supply port 65 and the second supply port 67 with each other, and then controls the second drive section 82 in the step S296 to push the plunger 96. By pushing the plunger 96 after the first supply port 65 and the second supply port 67 are communicated with each other, the shaping material in the cylinder 95 is discharged to the inside of the recessed part 75. Therefore, the shaping material inflowing into the second supply port 67 is pressurized, and thus, the ejection of the shaping material from the nozzle 61 is promptly resumed. Therefore, the shaping of the three-dimensional shaped article is promptly resumed.

According to the three-dimensional shaping device 100b in the present embodiment described hereinabove, the control section 500 controls the ejection amount control mechanism 70 to block off the inflow of the shaping material from the first supply port 65 into the second supply port 67, and then controls the second drive section 82 to pull the plunger 96 to thereby suction the shaping material in the nozzle and the second supply port 67 into the cylinder 95. Subsequently, the control section 500 controls the ejection amount control mechanism 70 to communicate the first supply port 65 and the second supply port 67 with each other, and then controls the second drive section 82 to push the plunger 96 to thereby discharge the shaping material thus suctioned into the cylinder 95 to the inside of the recessed part 75. In other words, the control section 500 resumes the supply of the shaping material from the first supply port 65 to the second supply port 67, and then terminates the transfer of the shaping material by the transfer mechanism 90. By discharging the shaping material located in the cylinder 95 to the inside of the recessed part 75 after the first supply port 65 and the second supply port 67 are communicated with each other, it is possible to pressurize the shaping material inflowing into the second supply port 67. Therefore, the ejection of the shaping material from the nozzle 61 is promptly resumed. Therefore, it is possible to improve the response in ejecting the shaping material from the nozzle 61 when resuming the ejection of the shaping material from the nozzle 61.

C. Third Embodiment

Figure 12:
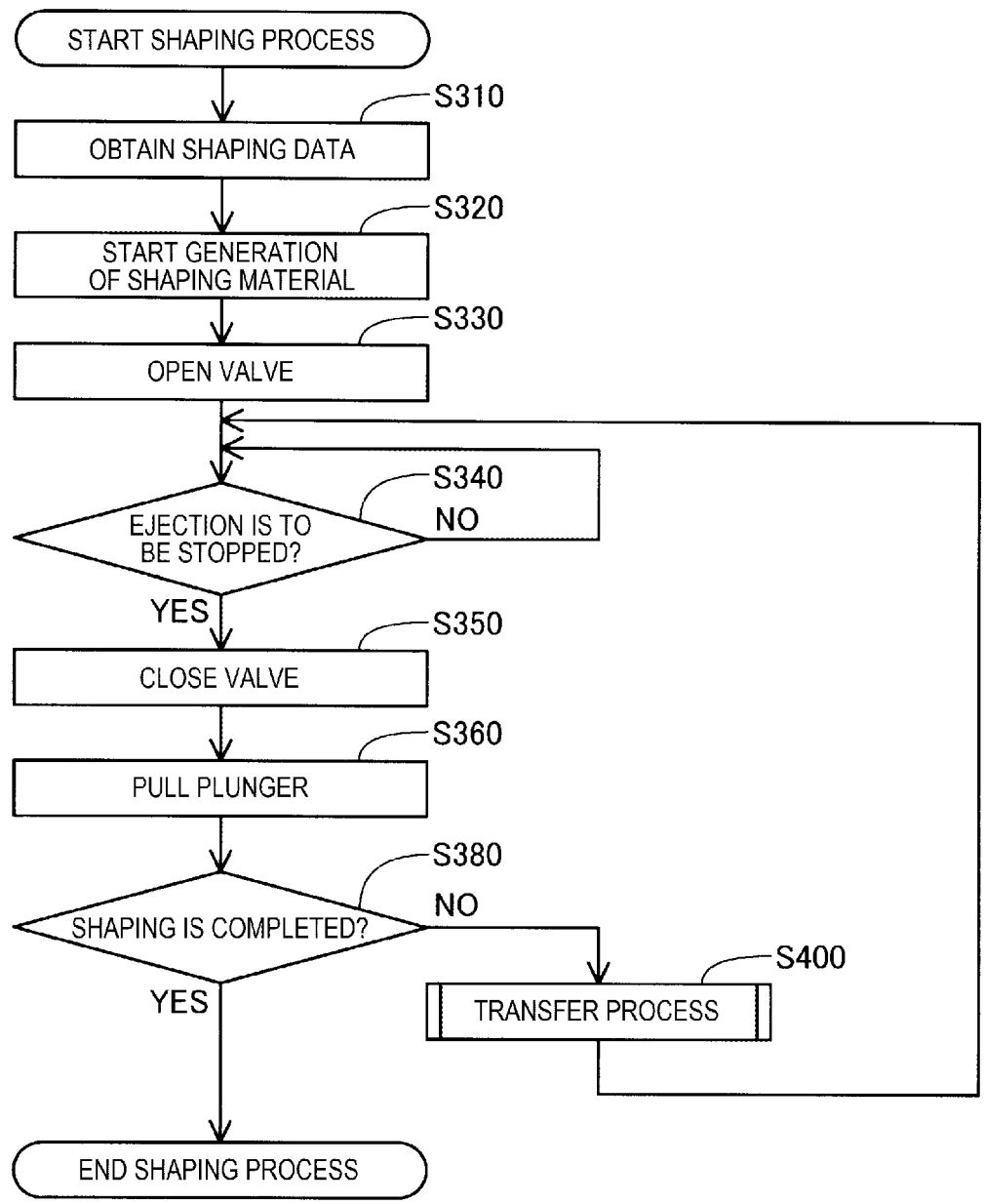
FIG. 12 is a flowchart showing a content of a shaping process in a third embodiment.

FIG. 12 is a flowchart showing a content of the shaping process executed in a three-dimensional shaping device 100c according to a third embodiment. The third embodiment is different in the content of the shaping process from the first embodiment. The other configurations are the same as those of the first embodiment shown in FIG. 1 unless particularly described.

The content of the process in the steps S310 through S360 is the same as in the first embodiment. The control section 500 controls the ejection amount control mechanism 70 in the step S350 to stop the ejection of the shaping material from the nozzle 61, then controls the second drive section 82 in the step S360 to pull the plunger 96, and then determines in the step S380 whether or not the shaping of the three-dimensional shaped article has been completed. When it has been determined in the step S380 that the shaping of the three-dimensional shaped article has been completed, the control section 500 terminates this process. In contrast, when it has not been determined in the step S380 that the shaping of the three-dimensional shaped article has been completed, the control section 500 executes the transfer process in the step S400.

Figure 13:
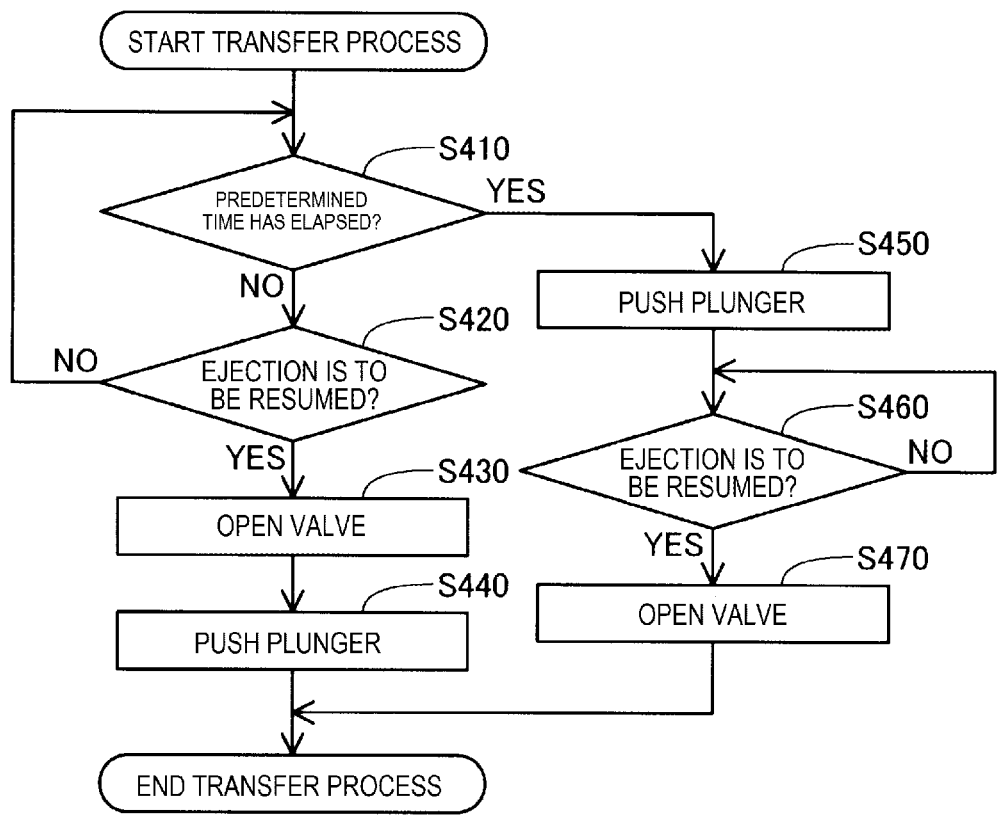
FIG. 13 is a flowchart showing a content of a transfer process in the third embodiment.

FIG. 13 is a flowchart showing a content of the transfer process in the present embodiment. In the step S410, the control section 500 determines whether or not a predetermined time has elapsed after controlling the ejection amount control mechanism 70 to stop the ejection of the shaping material from the nozzle 61. The predetermined time can be set as the time within a range in which the shaping material does not denature in the nozzle 61 or the second supply port 67 by examining the time from controlling the ejection amount control mechanism 70 to stop the ejection of the shaping material from the nozzle 61 to when the shaping material in the nozzle 61 and the second supply port 67 denatures with the experiment performed in advance.

When it has not been determined in the step S410 that the predetermined time has elapsed after controlling the ejection amount control mechanism 70 to stop the ejection of the shaping material from the nozzle 61, the control section 500 determines in the step S420 whether to resume the ejection of the shaping material from the nozzle 61. When it has not been determined in the step S420 that the ejection of the shaping material from the nozzle 61 is to be resumed, the control section 500 returns the process to the step S410 to determine whether or not the predetermined time has elapsed after controlling the ejection amount control mechanism 70 to stop the ejection of the shaping material from the nozzle 61 once again. In contrast, when it has been determined in the step S420 that the ejection of the shaping material from the nozzle 61 is to be resumed, namely when it has been determined that the ejection of the shaping material from the nozzle 61 is to be resumed before the predetermined time elapses after controlling the ejection amount control mechanism 70 to stop the ejection of the shaping material from the nozzle 61, the control section 500 controls the ejection amount control mechanism 70 in the step S430 to communicate the first supply port 65 and the second supply port 67 with each other, and then controls the second drive section 82 in the step S440 to push the plunger 96. By pushing the plunger 96 after the first supply port 65 and the second supply port 67 are communicated with each other, the shaping material inflowing into the second supply port 67 is pressurized, and thus, the ejection of the shaping material from the nozzle 61 is promptly resumed. Therefore, the shaping of the three-dimensional shaped article is promptly resumed.

When it has been determined in the step S410 that the predetermined time has elapsed after controlling the ejection amount control mechanism 70 to stop the ejection of the shaping material from the nozzle 61, namely when it has not been determined that the ejection of the shaping material from the nozzle 61 is to be resumed until the predetermined time has elapsed after controlling the ejection amount control mechanism 70 to stop the ejection of the shaping material from the nozzle 61, the control section 500 controls the second drive section 82 in the step S450 to thereby push the plunger 96. By pushing the plunger 96, the shaping material located in the cylinder 95 is discharged to the inside of the recessed part 75. Subsequently, in the step S460, the control section 500 determines whether or not the ejection of the shaping material from the nozzle 61 is to be resumed. When it has not been determined in the step S460 that the ejection of the shaping material from the nozzle 61 is to be resumed, the control section 500 stands ready to shape the three-dimensional shaped article while repeating the process in the step S460 until it is determined that the ejection of the shaping material from the nozzle 61 is to be resumed. In contrast, when it has been determined in the step S460 that the ejection of the shaping material from the nozzle 61 is to be resumed, the control section 500 controls the ejection amount control mechanism 70 in the step S470 to thereby communicate the first supply port 65 and the second supply port 67 with each other to resume the ejection of the shaping material from the nozzle 61. By the ejection of the shaping material from the nozzle 61 being resumed, shaping of the three-dimensional shaped article is resumed.

According to the three-dimensional shaping device 100c in the present embodiment described hereinabove, when it has not been determined that the ejection of the shaping material from the nozzle 61 is to be resumed until the predetermined time has elapsed after controlling the ejection amount control mechanism 70 to stop the ejection of the shaping material from the nozzle 61, the control section 500 pushes the plunger 96 to discharge the shaping material from the inside of the cylinder 95 to the inside of the recessed part 75. Therefore, it is possible to prevent the shaping material in the cylinder 95 from denaturing. In contrast, when it has been determined that the ejection of the shaping material from the nozzle 61 is to be resumed before the predetermined time elapses after controlling the ejection amount control mechanism 70 to stop the ejection of the shaping material from the nozzle 61, the control section 500 controls the ejection amount control mechanism 70 to communicate the first supply port 65 and the second supply port 67 with each other, and then pushes the plunger 96 to discharge the shaping material from the inside of the cylinder 95 to the inside of the recessed part 75. By discharging the shaping material located in the cylinder 95 to the inside of the recessed part 75 after the first supply port 65 and the second supply port 67 are communicated with each other, it is possible to pressurize the shaping material inflowing into the second supply port 67. Therefore, the ejection of the shaping material from the nozzle 61 is promptly resumed. Therefore, it is possible to improve the response in ejecting the shaping material from the nozzle 61 when resuming the ejection of the shaping material from the nozzle 61. Therefore, it is possible to prevent the shaping material from denaturing in the cylinder 95 while improving the response in ejecting the shaping material from the nozzle 61.

D. Other Embodiments (D1) In the three-dimensional shaping devices 100, 100b, and 100c according to the respective embodiments described above, the transfer mechanism 90 is constituted by the cylinder 95, the plunger 96, and the check valve 94. In contrast, it is also possible for the transfer mechanism 90 to be formed of a pump coupled to the first branch port 92 and the second branch port 93.

(D2) In the three-dimensional shaping devices 100, 100b, and 100c according to the respective embodiments described above, the transfer mechanism 90 is provided with the check valve 94 disposed in the first branch port 92. In contrast, the transfer mechanism 90 is not required to be provided with the check valve 94. In this case, for example, it is possible to adopt a configuration in which the shaping material in the cylinder 95 is discharged to the second branch port 93 when pushing the plunger 96 by setting the pressure loss in the first branch port 92 larger than the pressure loss in the second branch port 93 and the communication part 76.

(D3) In the three-dimensional shaping devices 100, 100b, and 100c according to the respective embodiments described above, the check valve 94 is disposed in the first branch port 92. In contrast, it is also possible to adopt a configuration in which the check valve 94 is not disposed in the first branch port 92, but a check valve for restricting the inflow of the shaping material from the first supply port 65 to the cylinder 95 is disposed in the second branch port 93. In this case, for example, it is possible to adopt a configuration in which the shaping material in the cylinder 95 is discharged to the second branch port 93 when pushing the plunger 96 by setting the pressure loss in the first branch port 92 larger than the pressure loss in the second branch port 93 and the communication part 76. Further, by disposing the check valve in the second branch port 93, it is possible to prevent the shaping material in the first support port 65 from flowing into the cylinder 95 from the second branch port 93.

(D4) In the three-dimensional shaping devices 100, 100b, and 100c according to the respective embodiments described above, the check valve 94 is disposed in the first branch port 92. In contrast, it is also possible to adopt a configuration in which the check valve 94 is disposed in the first branch port 92, and further, a check valve for restricting the inflow of the shaping material from the first supply port 65 to the cylinder 95 is disposed in the second branch port 93. In this case, it is possible to prevent the inflow of the shaping material from the first supply port 65 to the cylinder 95, and at the same time, it is possible to prevent the outflow of the shaping material from the cylinder 95 to the second supply port 67.

(D5) In the three-dimensional shaping devices 100, 100b, and 100c according to the respective embodiments described above, the first branch port 92 and the second branch port 93 are coupled to each other via the cylinder 95. In contrast, the first branch port 92 and the second branch port 93 can also be directly coupled to each other. Also in this case, by coupling the cylinder 95 to the coupling part between the first branch port 92 and the second branch port 93, it is possible to suction the shaping material in the nozzle 61 and the second supply port 67 into the cylinder 95 via the first branch port 92, and to discharge the shaping material in the cylinder 95 to the inside of the recessed part 75 via the second branch port 93.

(D6) In the three-dimensional shaping devices 100, 100b, and 100c according to the respective embodiments described above, the first branch port 92 is coupled to the second supply port 67. In contrast, the first branch port 92 can also be coupled to the nozzle flow channel 68.

(D7) In the three-dimensional shaping devices 100, 100b, and 100c according to the respective embodiments described above, the second branch port 93 is coupled to the first supply port 65. In contrast, the second branch port 93 can also be coupled to the communication hole 56 of the barrel 50. In this case, it is not required to provide the communication part 76 to the valve part 73 of the ejection amount control mechanism 70.

(D8) In the three-dimensional shaping devices 100, 100b, and 100c according to the respective embodiments described above, the ejection amount control mechanism 70 can be formed of a gate valve, a globe valve, a ball valve, or the like.

(D9) In the three-dimensional shaping devices 100, 100b, and 100c according to the respective embodiments described above, the nozzle heater 160 can be eliminated.

(D10) In the three-dimensional shaping devices 100, 100b, and 100c according to the respective embodiments described above, the melting section 30 is provided with the flat screw 40, and melts the material using the rotation of the flat screw 40. In contrast, it is also possible for the melting section 30 to be provided with an in-line screw having a spiral groove formed on the elongated shaft instead of the flat screw 40, and to melt the material using the rotation of the in-line screw.

E. Other Aspects

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a three-dimensional shaping device. The three-dimensional shaping device includes a melting section configured to melt a material to generate a shaping material, a supply flow channel which is communicated with the melting section, and through which the shaping material flows, a nozzle communicated with the supply flow channel and configured to eject the shaping material, an ejection amount control mechanism provided to the supply flow channel, and configured to control a flow amount of the shaping material to be ejected from the nozzle, a branch flow channel branched from a first partial flow channel as a flow channel between the melting section and the ejection amount control mechanism out of the supply flow channel, and communicated with a second partial flow channel as a flow channel between the ejection amount control mechanism and the nozzle out of the supply flow channel, and a transfer mechanism configured to transfer the shaping material in the second partial flow channel to the first partial flow channel via the branch flow channel.

According to the three-dimensional shaping device of this aspect, it is possible to transfer the shaping material in the nozzle and the second partial flow channel to the first partial flow channel via the branch flow channel. Therefore, the stringing of the shaping material from the nozzle and the denaturation of the shaping material in the nozzle and the second partial flow channel can be prevented.

(2) In the three-dimensional shaping device according to the aspect described above, the transfer mechanism may include a cylinder having a cylindrical shape and communicated with the branch flow channel, a plunger reciprocating in the cylinder, and a check valve which is disposed in a part between the second partial flow channel and the cylinder out of the branch flow channel, and is configured to prevent outflow of the shaping material from the cylinder to the second partial flow channel.

According to the three-dimensional shaping device of this aspect, it is possible to effectively transfer the shaping material in the second partial flow channel to the first partial flow channel due to the reciprocation of the plunger while preventing the outflow of the shaping material from the cylinder to the second partial flow channel with the check valve.

(3) In the three-dimensional shaping device according to the aspect described above, the ejection amount control mechanism may include a valve part which is configured to be able to rotate in the supply flow channel, and has a flow passage through which the shaping material flows, and the ejection amount control mechanism may change a flow amount of the shaping material flowing from the first partial flow channel into the second partial flow channel via the flow passage in accordance with a rotation of the valve part. According to the three-dimensional shaping device of this aspect, it is possible to control the flow amount of the shaping material to be ejected from the nozzle with a simple configuration.

(4) The three-dimensional shaping device according to the aspect described above may further include a heating section configured to heat the shaping material in the second partial flow channel.

According to the three-dimensional shaping device of this aspect, it is possible to enhance the fluidity of the shaping material to be ejected from the nozzle by heating the shaping material in the second partial flow channel using the heating section.

The present disclosure can be implemented in a variety of aspects other than the three-dimensional shaping device. For example, the present disclosure can also be implemented as an aspect such as a method of controlling a three-dimensional shaping device or a method of shaping a three-dimensional shaped article.

What is claimed is:

1. A three-dimensional shaping device comprising:
 a melting section configured to melt a material to generate a shaping material;
 a supply flow channel which is communicated with the melting section, and through which the shaping material flows;
 a nozzle communicated with the supply flow channel and configured to eject the shaping material;
 an ejection amount control mechanism provided to the supply flow channel, and configured to control a flow amount of the shaping material to be ejected from the nozzle;
 a branch flow channel branched from a second partial flow channel as a flow channel between the ejection amount control mechanism out of the supply flow channel and the nozzle out of the supply flow channel, and communicated with a first partial flow channel as a flow channel between the melting section and the ejection amount control mechanism; and
 a transfer mechanism which includes:
  a cylinder having a cylindrical shape and communicated with the branch flow channel;
  a plunger reciprocating in the cylinder; and
  a check valve which is disposed in a part between the second partial flow channel and the cylinder out of the branch flow channel, and is configured to prevent outflow of the shaping material from the cylinder to the second partial flow channel,
 wherein the transfer mechanism is configured to transfer the shaping material in the second partial flow channel to the first partial flow channel via the branch flow channel.

2. The three-dimensional shaping device according to claim 1, wherein
 the ejection amount control mechanism includes a valve part which is configured to be able to rotate in the supply flow channel, and has a flow passage through which the shaping material flows, and
 the ejection amount control mechanism changes a flow amount of the shaping material flowing from the first partial flow channel into the second partial flow channel via the flow passage in accordance with a rotation of the valve part.

3. The three-dimensional shaping device according to claim 1, further comprising:
 a heating section configured to heat the shaping material in the second partial flow channel.

4. The three-dimensional shaping device according to claim 1,
 wherein the first partial flow channel includes a first supply port and a through hole, and the second partial flow channel includes a second supply port, the first supply port and the second supply port being coupled to the through hole at different positions,
 wherein the branch flow channel includes a first branch port branched from the second supply port and a second branched port coupled to an end part of the through hole, and
 wherein the ejection amount control mechanism includes a valve part which includes:
  a recessed part that extends along a central axis of the valve part from below the first supply port to above the second supply port, and
  a communication part having a groove shape,
  wherein the communication part is different from the recessed part and the communication part communicates the first supply port to the second branch port.

* * * * *